United States Patent [19]
Nagashima

[11] Patent Number: 4,563,706
[45] Date of Patent: Jan. 7, 1986

[54] IMAGE FORMING SYSTEM

[75] Inventor: Nao Nagashima, Yokohama, Japan

[73] Assignee: Canon Kabushiki Kaisha, Tokyo, Japan

[21] Appl. No.: 617,723

[22] Filed: Jun. 6, 1984

Related U.S. Application Data

[63] Continuation of Ser. No. 307,152, Sep. 30, 1981, abandoned.

[30] Foreign Application Priority Data

Oct. 3, 1980 [JP] Japan ................................ 55-137670

[51] Int. Cl.$^4$ ............................................. H04N 1/40
[52] U.S. Cl. .................................. 358/280; 358/256; 358/257; 358/181; 358/903; 364/523
[58] Field of Search ............... 358/280, 256, 257, 181, 358/903; 360/14.1; 364/523

[56] References Cited

U.S. PATENT DOCUMENTS

| | | | |
|---|---|---|---|
| 3,751,582 | 8/1973 | Wernikoff | 358/257 |
| 3,958,088 | 5/1976 | Vieri | 358/257 |
| 4,106,060 | 8/1978 | Chapman | 358/256 |
| 4,420,247 | 12/1983 | Suzuki | 355/14 C |
| 4,454,575 | 6/1984 | Bushaw | 358/256 |

Primary Examiner—Howard W. Britton
Attorney, Agent, or Firm—Fitzpatrick, Cella, Harper & Scinto

[57] ABSTRACT

An image forming system has plural input devices for generating plural image data signals, and original image data signals by scanning an original, plural memories, plural output devices for reproducing the image of said original on a copying material, a first switch for storing the image data from either one or plurality of said input devices in either one of plurality of said memories, and second switch for releasing the image data from either one or plurality of said memories to either one or plurality of said output devices.

10 Claims, 15 Drawing Figures

IMAGE FORMING SYSTEM

This is a continuation division of application Ser. No. 307,152, filed Sept. 30, 1981, now abandoned.

BACKGROUND OF THE INVENTION

1. Field of the Invention

The present invention relates to an image forming system such as a copier or the like having an image memory.

2. Description of the Prior Art

The conventionally known electronic copier for electronically reproducing from image data stored in an image memory has been associated with certain difficulties in image data from plural image sources, because of the limited capacity of the image memory for storing the image data and of the only one processing channel provided in the copier. For example it has been structurally impossible or time-consuming at best to form images on an image recording medium such as paper by a same electronic copier from image data of an original read by an original scanner and image data of a document prepared by a word processor. Even in case such processing is possible, because of the deficient capacity of the image memory or the deficiency in number of processing channels, the electronic copier has been unable to accept the data entry from an image source until the image reproduction for another image source is completed, and has had to handle the image reproduction in the following procedure of:

(1) storing the image data of the original in the image memory;

(2) reproducing image from the data stored in the image memory;

(3) storing the image data of the document in the image memory; and (4) reproducing image from the data stored in the image memory.

In the above-mentioned manner, in case the original scanner and the word processor are both utilized in the copier, either one of these image sources has to wait until the access of the other to the copier is completed, and the image sources of the electronic copier itself is inevitably associated with a deteriorated efficiency of use, requiring a longer image processing time.

SUMMARY OF THE INVENTION

In consideration of the foregoing, the object of the present invention is to provide an image forming system not associated with aforementioned drawbacks.

Another object of the present invention is to provide an image forming system capable of orderly reproducing images from mutually different plural image sources by means of a common image printing device.

Still another object of the present invention is to provide an image forming system capable of orderly reproducing images from a common image source through either one of an image printing device and other output devices.

Still another object of the present invention is to provide an image forming system capable, prior to the start of reproduction of an image from an image source, of processing the image data from another image source.

Still another object of the present invention is to provide an electronic copying system provided with the image memory of an increased capacity through the use of semi-conductor memories and capable of rapidly processing the image data through the use of a multi-channel image memory of a large capacity.

Still another object of the present invention is to provide an electronic copying system provided with plural input and output terminals for image data entry into the image memory and for image data supply from said memory to the copier to allow interchangeable connection of plural image memories for plural image data, thereby enabling multi-purpose use of said image memories.

Still another object of the present invention is to provide an electronic copying system capable, at the multi-purpose use of image memories, of displaying or recording the connecting state of the input/output devices to the image memories thereby improving the efficiency of use thereof.

Still another object of the present invention is to provide a system capable of storing the image data from an image source into plural memories for mutually different purposes, or of reproducing said image data by means of plural output devices.

Still another object of the present invention is to provide a system capable of processing the image data from a memory in plural output devices for mutually different purposes.

Still another object of the present invention is to provide a system capable of easily transferring the image data between memories for different purposes.

Still another object of the present invention is to provide a system in which plural image sources and a copier are mutually combined by pixel data signals.

The foregoing and still other objects of the present invention will be clarified in detail from the following description of the preferred embodiments of the present invention.

DESCRIPTION OF THE PREFERRED EMBODIMENTS

Now the present invention will be clarified in detail by the following description of the preferred embodiments thereof to be taken in conjunction with the attached drawings.

Figure 1:
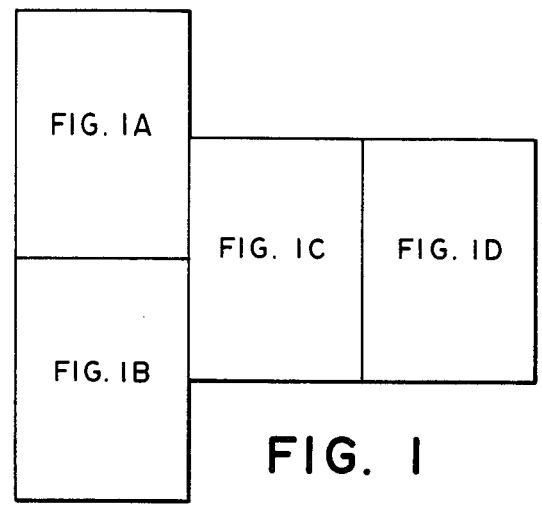
FIGS. 4 and 5-1 to 5-5 are control flow charts of the circuit shown in FIG. 3.

At first reference is made to FIG. 1 showing an embodiment of the copying unit for use in the copying system of the present invention, wherein there are shown a copying apparatus 1 comprising an image memory controller 10 and a printer unit 11–20; a sorter 2 for collating the sheets recording the images formed by the copying apparatus 1; an original scanner 3 for reading an original and providing corresponding image data; a cathode ray tube display device 4 for indicating the state of the copying apparatus 1; a general purpose computer 5 for document preparation, arithmetic calculations etc. designed in the illustrated embodiment to share the cathode ray tube display device 4 with the copying apparatus 1; and a communication device 6 such as a facsimile for transmitting and receiving the image data through a communication channel such as a telephone line.

In ordinary mode the copying apparatus 1 performs the copying operation according to the image data supplied from the original scanner 3, as will be briefly explained in the following in relation to the cross-sectional view of the copying apparatus shown in FIG. 2.

Figure 2:
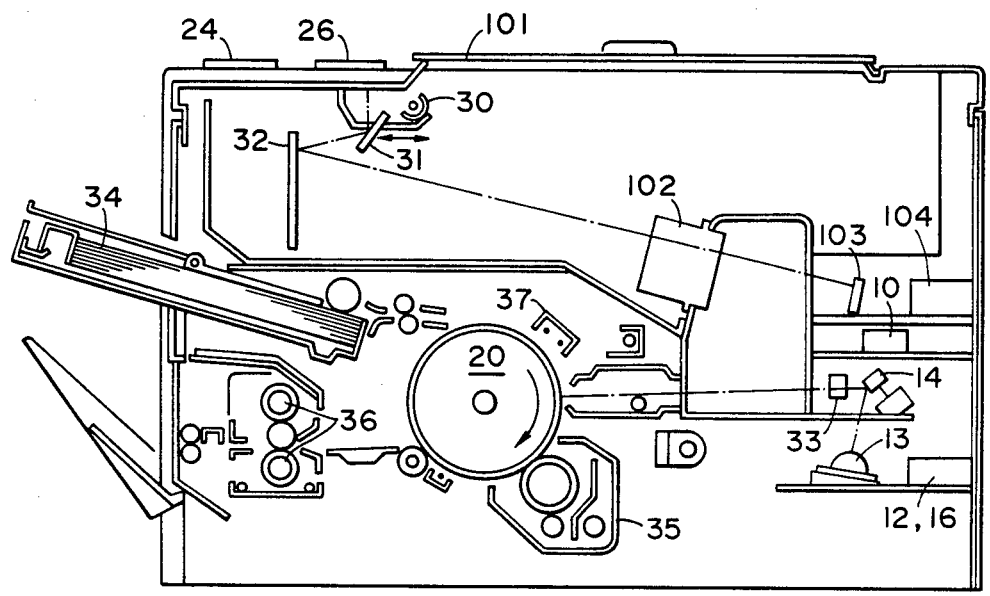
FIG. 2 is a cross-sectional view of a copier in which the present invention is applied.

Referring to FIG. 2 an original 101 placed on an original carriage glass is illuminated upon actuation of an operation key 24 by an illuminating lamp 30 structured integral with a first scanning mirror 31, and the reflected light is scanned by said first scanning mirror 31 and a second scanning mirror 32 which are moved at a speed ratio of 1:½ to maintain a constant optical path length in front of a lens 102 thereby achieving slit scanning of said original.

The image thus reflected is focused through the lens 102 onto the photoreceptor area of an image sensor 103, whereby said image for every slit line is converted into electric signals by the self-scanning function of the charge-coupled device and stored in buffer memories. Then the data of one slit line are serially released from said buffer memories and stored, after conversion into parallel data, into an image memory 59 or 60 to be explained later.

After the storage of the data corresponding to one page of the original, thus stored image data are supplied through buffer memories to a laser unit for commencing the deflection and modulation thereof.

The generated laser beam is deflected into a horizontal sweeping motion by a polygonal mirror 14 rotated at a constant speed, and directed through an f-θ lens to the photosensitive paper on a drum 20 charged by a charger 37 in advance, thereby performing horizontal scanning motion thereon. The drum is rotated at a constant speed to perform the scanning in the vertical direction, and said horizontal and vertical scanning motions are conducted at such speeds that the electrostatic latent image formed on said drum coincides in size with that of the original image. The latent image is developed in a developing station 35 into a visible image which is fixed by fixing rollers 36 onto the paper sheet and is then finally ejected.

The copy thus obtained reproduces the data of entire pixels of the original stored in the image memory. If plural copying operations are preselected by numeral keys in the operation keys 24, the data read-out from the image memory is initiated again, upon completion of the beam scanning for one copy, to re-start the beam scanning, thus repeating the latent image formation in the aforementioned manner and supplying the sheets consecutively in the corresponding manner to obtain a desired number of copies.

The entire copying operation of the copying apparatus 1 is controlled by a central processing unit 32 shown in FIG. 1.

The central process unit (CPU) shown in each unit indicates a microprocessor which constitutes a known microcomputer system for controlling various functions in cooperation with the associated program memory ROM, data memory RAM, interface I/F etc.

The central processing unit 32 of the copying apparatus 1 (hereinafter referred to as the copy processor CPU) controls the image memory controller 10, printer unit 11-20 and original scanner 3 respectively through an interface circuit 33, a printer control circuit 17 and an interface circuit 34, utilizing the read-only memory 31 for storing already known microprograms for key entry, display and copy sequence control and the working random access memory 30.

The starting or stopping of the copying apparatus is controlled by the operation keys 24 or a keyboard 206 provided in the cathode ray tube display unit 4. The control data entered from the operation keys 24, such as copy start, copy interruption or repeated copying, are transmitted through an interface circuit 23 to the copy processor CPU 32 for contributing to the execution of the copy control process. A display panel 26 controlled by the copy processor CPU is provided to indicate the number of copies entered from the operation keys 24 and the current state of the copying apparatus 1 such as the start, stop, stand-by or number of copies already made.

A printer control circuit 17 for laser control and a main drive system 21 for driving the drum 20 etc. drive the laser driver 12 in response to an instruction from the copy processor CPU 32 and in synchronization with the image data signals from the image memory controller 10. Said image data signals are supplied through a terminal O1, interface circuit 11, laser driver 12 and laser 13 to control the laser beam therefrom which records the image on the photosensitive paper 34 on the drum 20 by means of the polygonal mirror 14 for deflecting said laser beam into scanning motion, a motor 15 for rotating said polygonal mirror 14, a motor driver circuit 16 for controlling said motor 15 and a beam detector 19 for detecting the position of said laser beam.

The transmission of control signals between the copy processor CPU 32 and the image memory controller 10 is conducted through an interface circuit 33. Said CPU 32 transmits the command signals for image data processing such as image conversion, the signals for switching the input/output ports of the image memory such as the signals entered from the operation keys 24 and the command signals for starting or terminating the write-in or read-out of the image data to the image memory controller 10, and said memory controller 10 transmits the signals indicating the status of the image memory or of the input/output ports thereof to the copy processor CPU.

Also there is provided an interface circuit 34 for executing the transmission of control signals between the copy processor CPU 32 and the original scanner 3 for control thereof such as starting and stopping of the original scanning.

Now there will be given an explanation on the function of various image sources constituting the input devices. The original scanner 3 reads the originals 101 supplied by an automatic document feeder 100 by means of the lens 102 and the solid-state imager or charge-coupled device 103, supplies the image data signals to a data input port I1 of the image memory controller 10 through a CCD driver 104, a pixel control circuit 105, and an interface circuit 106, controls the timing of various parts in cooperation with a scan processor CPU 110, a read-only memory 111 for storing the microprograms for the original scanning, a random access memory 112, interface circuits 113, 114 and an optical system drive circuit 107, and exchanges the signals indicating the species and state of the apparatus with a control port CI1 of the image memory controller 10 through a control circuit 108 and an interface circuit 109.

The cathode ray tube display unit 4 used as the display terminal for the copying apparatus 1 and the general-purpose computer 5 through an interface circuit 200 is composed of a display processor CPU 201, a read-only memory 202 for storing the microprograms for display control, a random access memory 203, a keyboard 206, an interface circuit 205, a cathode ray tube control circuit 207, a graphic control circuit 208, a character generator 210, an interface circuit 209 and a cathode ray tube 211, and performs display of graphic patterns and characters entered by the keyboard 206.

Routine jobs such as the image conversion procedure or the copy number control to be conducted in the copying apparatus 1 can be entered as programs from the keyboard 206 of the cathode ray tube display unit 4, transferred to the copying apparatus 1 in the form of signals executable therein and stored in a magnetic bubble memory 29 through an interface circuit 28. The copy processor CPU 32 is so designed as to automatically execute a series of routine copying jobs by simple operations, utilizing said magnetic bubble memory 29.

The general-purpose computer 5 is composed of a word processor CPU 300, a read-only memory 301 for storing the microprograms for the word processing control, a random access memory 302, a floppy disk device 304 controlled through an interface circuit 303, a mangetic disk device 306 controlled through an interface circuit 305 and an interface circuit 308 connected to the interface 200 of the cathode ray tube display unit 4, and performs document preparation and arithmetic calculations utilizing said cathode ray tube display unit 4. The document or the result of calculation to be reproduced by the copying apparatus 1 is supplied to the image memory controller 10 in the state of image data, which are not character code signals but pixel signals, through a character generator 310 for converting character codes into pixel signals and an interface circuit 311 connected to an input port I3 of said controller 100. An interface circuit 309 connected to an input port IC3 of said controller 10 performs the exchange of the signals indicating the species and state of the apparatus with the image memory controller 10.

The communication unit 6 for exchanging the image data signals through a communication channel 412 and a modem 403 is provided with a CPU 400, a read-only memory 401 for storing the microprograms for transmission-reception control, a random access memory 402, a receiving unit composed of a receiving circuit 404, a pixel converting circuit 406 for converting the band-compressed reception image data into the data processable by the image memory controller 10 and an interface circuit 408 connected to an input port I2 of said controller 10, and a transmitting unit composed of an interface circuit 409 connected to an output port O2 of the image memory controller 10, a pixel converting circuit 407 for converting the data from said controller 10 into the signals adapted to the communication channel and a transmitting circuit 405. Also the communication unit 6 exchanges the signals indicating the species and state of the connected input/output devices with said controller 10 through an interface circuit 411 connected to ports CI2, CO2 of said controller 10 and a control circuit 410. The printer unit and the transmitting unit connected to output ports O1, O2 of said controller 10 constitute the output devices.

In the copying system shown in FIG. 1 composed of the above-explained copying apparatus and various input/output units, the image memory controller 10 controls the exchange of image data and control signals among the original scanner 3, general-purpose computer 5, communication unit 6 and printer unit. Since the form of the image data signals and of the control signals is unified throughout the system, it is possible also to connect for example the ports CI3, I3 of the memory controller 10 to the original scanner 3. Also each component unit of the copying system can be easily designed since the entire system is divided as shown in FIG. 1 into the image source units, image data storage unit, image data reproducing unit etc. with unified forms of data signals. It is therefore rendered possible to design a terminal required in the future without requiring a change in design of the rest of the apparatus.

Figure 3:
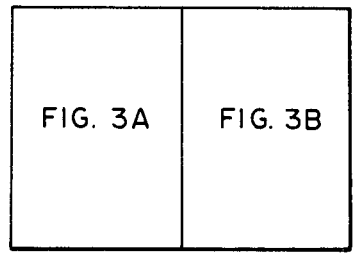
FIGS. 3A and 3B, combined as shown in FIG. 3, show in these combination is a control circuit diagram showing an embodiment of the image memory controller for use in the system shown in FIG. 1.
Figure 1A:
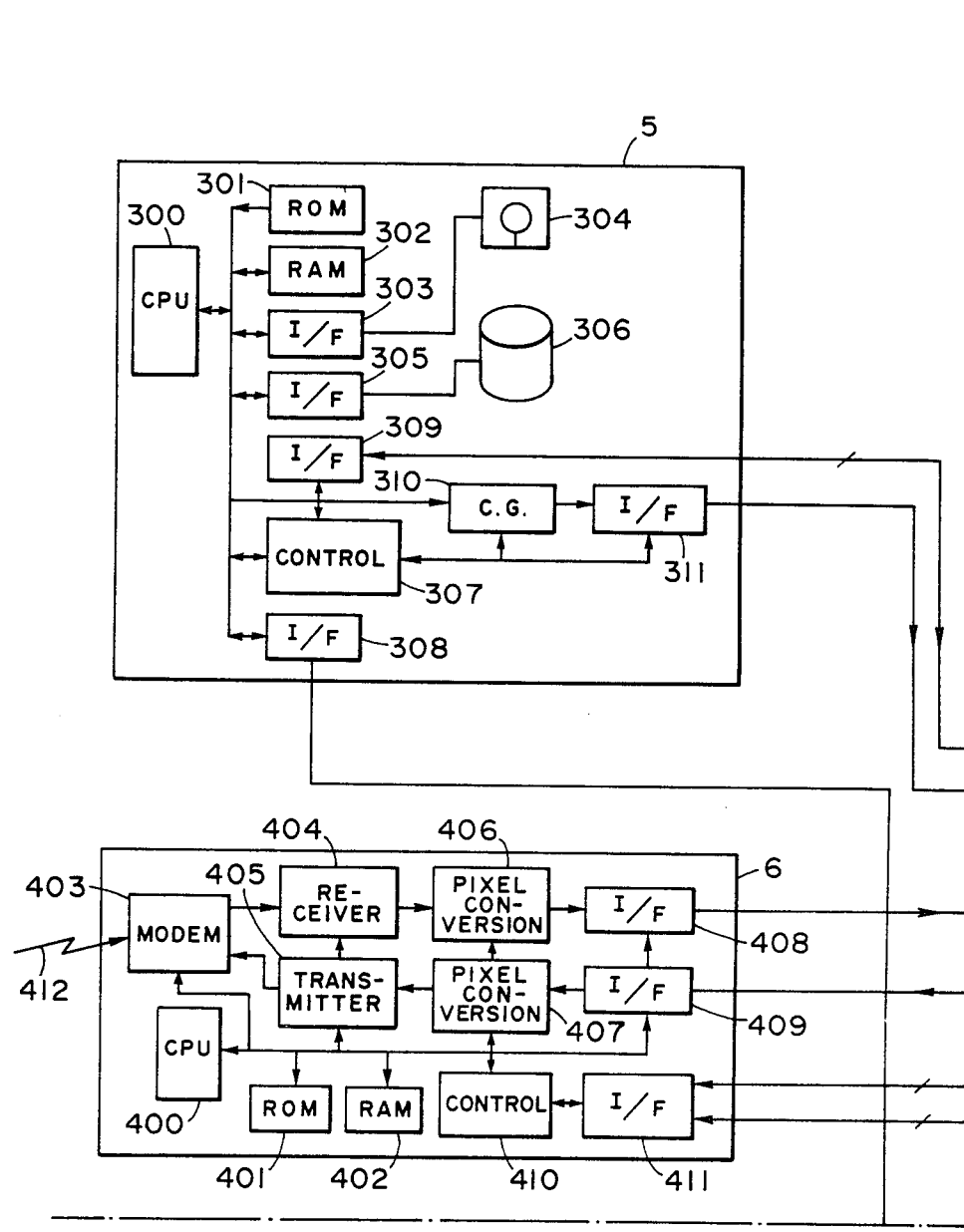
FIGS. 1A, 1B, 1C and 1D, combined as shown in FIG. 1, show in these combination a control block diagram showing the structure of the copying unit in the system of the present invention.
Figure 1B:
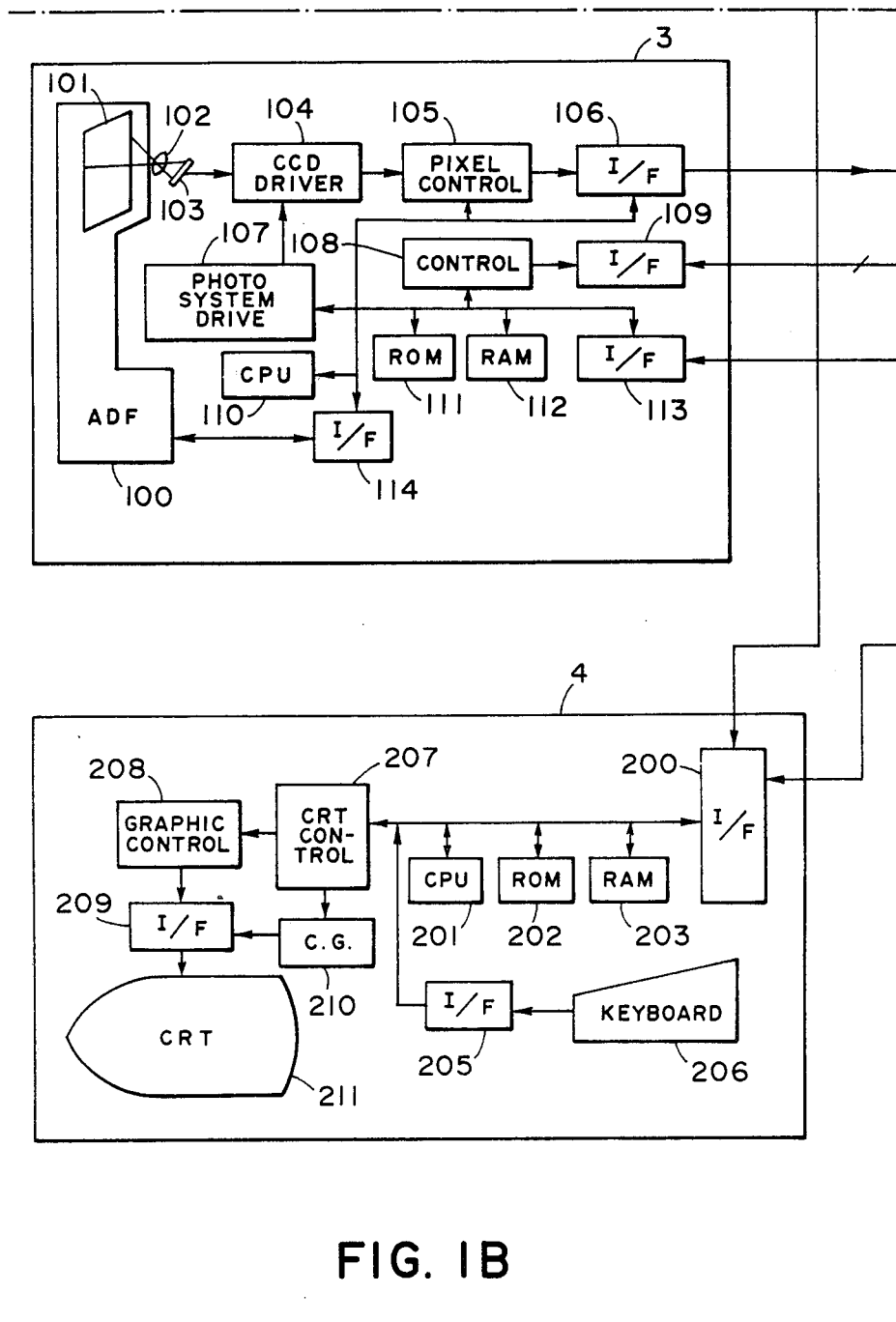
Figure 1C:
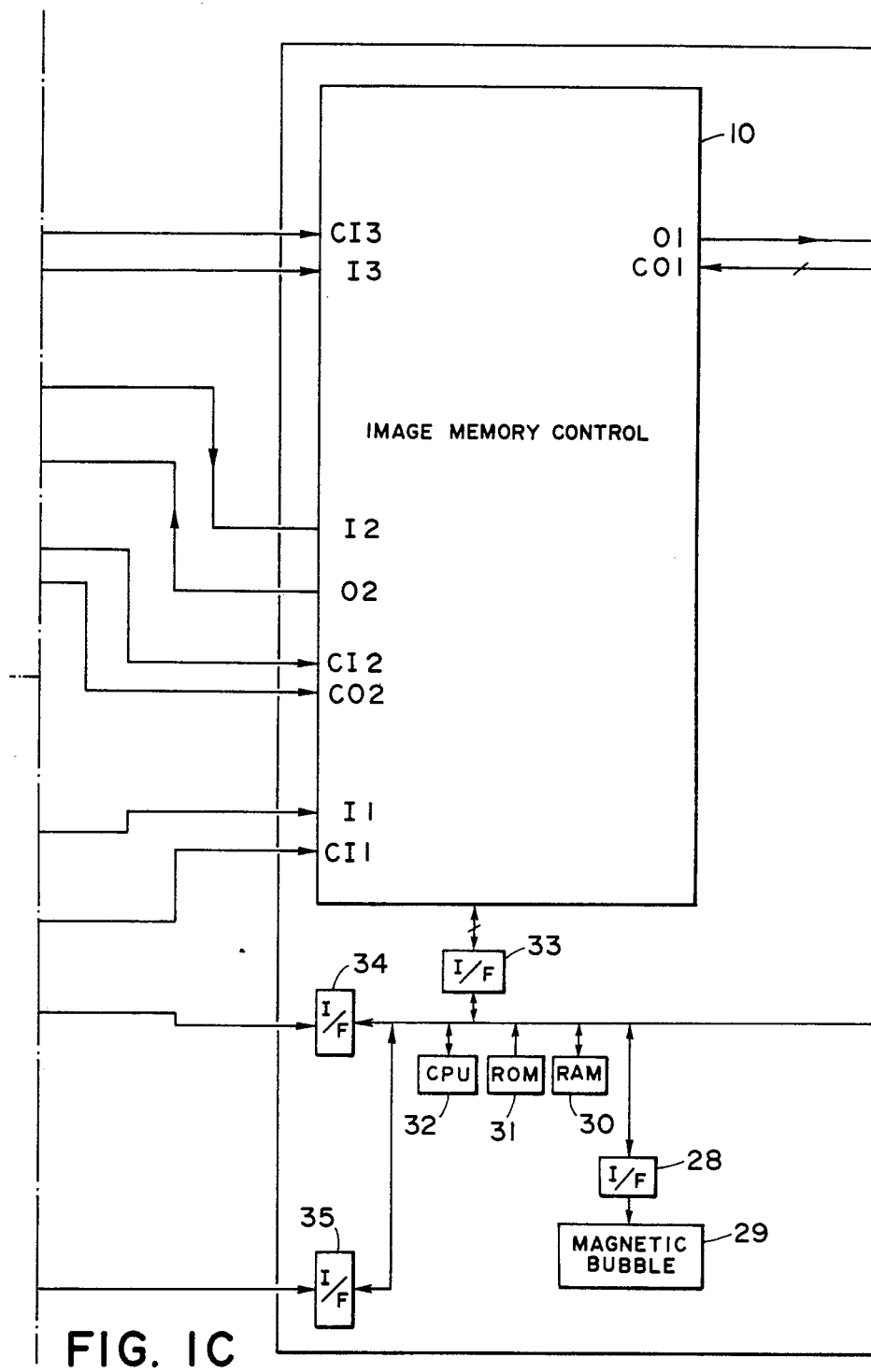
Figure 1D:
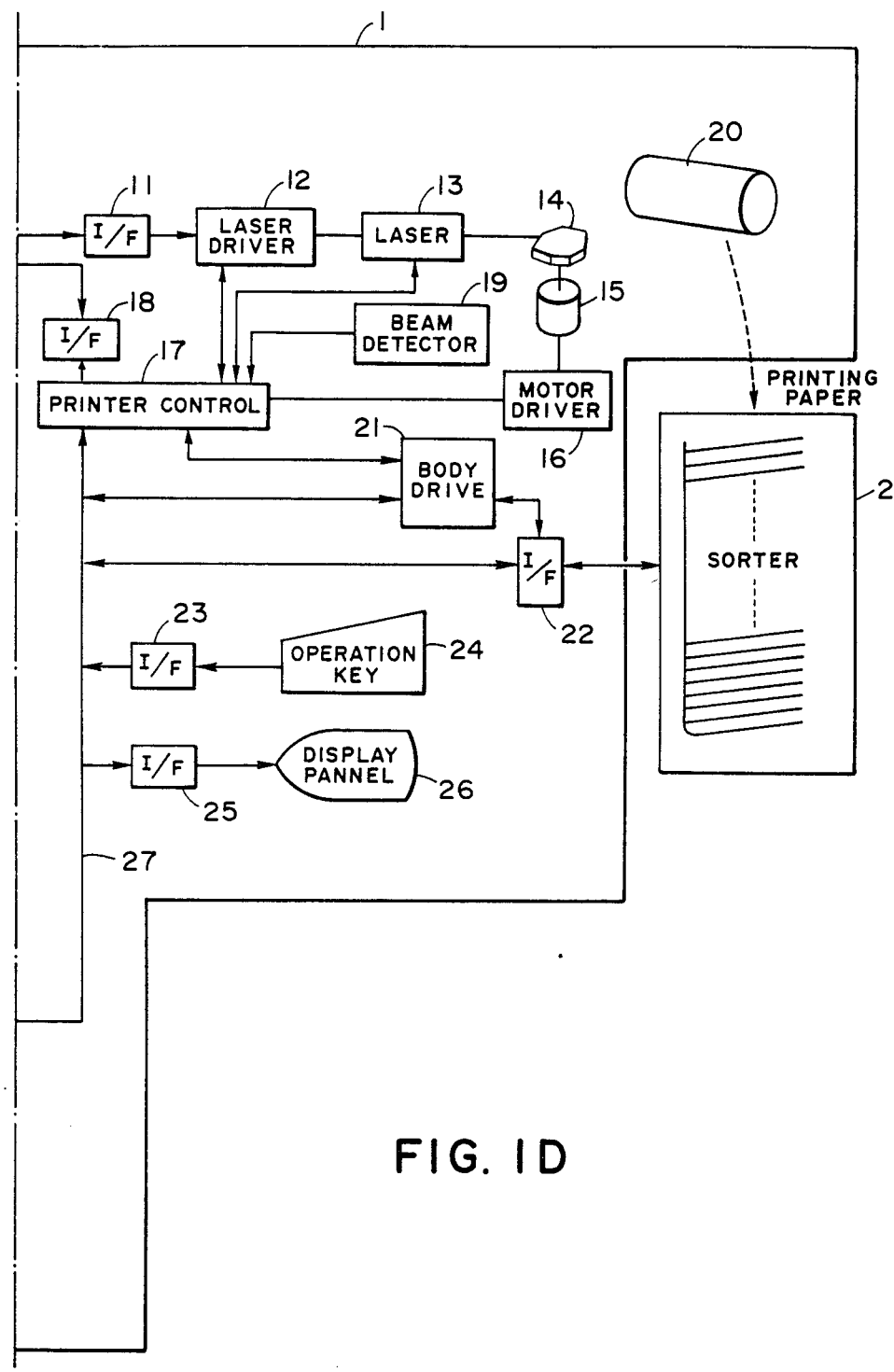
Figure 3A:
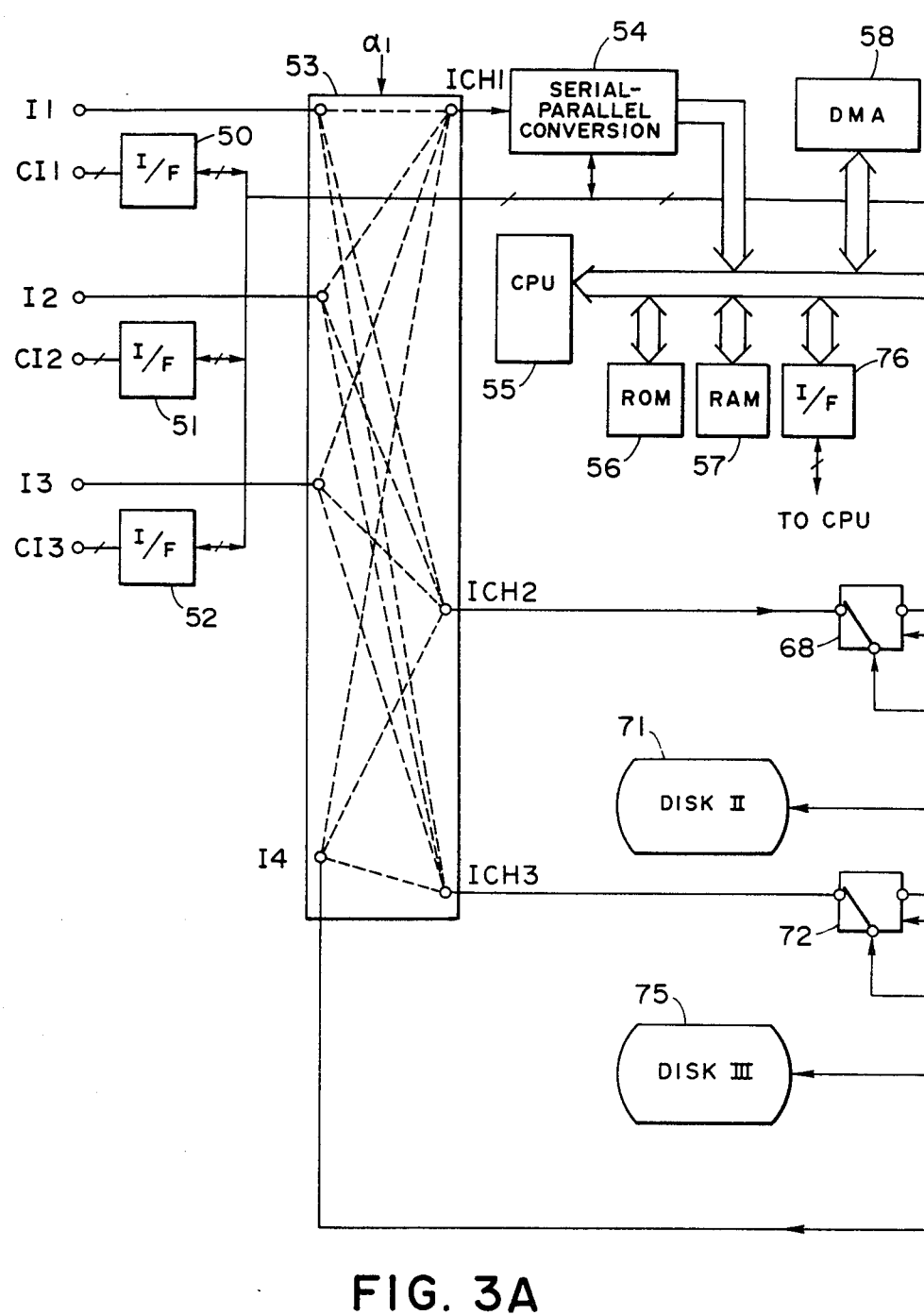

Now reference is made to FIG. 3 showing the details of the image memory controller 10, wherein shown are input ports I1, I2 and I3 for entering image data from input units, control signal input/output ports CI1, CI2 and CI3 respectively corresponding to said input ports, output ports O1 and O2 for supplying image data to output units, and control signal input/output ports CO1 and CO2 respectively corresponding to said output ports. These ports respectively correspond to those represented by the same symbols in the image memory controller 10 shown in FIG. 1.

Also an input port I4 and an output port O3 are mutually connected inside the controller 10 for data transmission therein, and the data transfer between different image memory channels can be conducted through said internally connected ports.

In normal mode the image data from the input port I1 are transferred through a channel port ICH1 to a system bus line 62 and stored in a memory 59 or 60. After completion of storage, said data are released through the bus line 62 and a channel port OCH1 automatically or in response to a key entry signal.

In the controller there are provided three image memory channels: i.e. an image memory channel I utilizing semi-conductor image memories 59, 60 for image data processing such as image editing through the system bus line 62 and under the control of a memory processor CPU 55, an image memory channel II utilizing a magnetic disk 71 for long-term storage of the image data, and an image memory channel III utilizing a magnetic disk 75, which are respectively provided with input ports ICH1, ICH2 and ICH3 and output ports OCH1, OCH2 and OCH3 for the data input/output. It is to be noted that the channel I has a capacity corresponding to a page, while the channels II and III have much larger capacities.

Said memory processor CPU 55 executes the above-mentioned image data processing utilizing a read-only memory 56 for storing the microprograms for memory input/output control according to the flow charts to be explained later and a random access memory 57, further controls interface circuits 50, 51, 52, 66, 67 for data input/output to or from input/output units, multiplexers 53, 65 and disk input/output control switches 68, 72 through the system bus line 62 for transmitting the image data and control signals and a peripheral control circuit 63 for releasing control signals $\alpha 1$ and $\alpha 2$, and further controls the image memory channels II and III.

A serial-parallel converting circuit 54 converts the serial image data signals from the channel input port ICH1 into parallel signals and stores said signals into the image memories 59, 60 for processing by the memory processor CPU 55. On the other hand the data transfer in the image memory channels II and III is conducted in serial form in order to reduce the number of signal lines required. The data transfer among the component units connected by the system bus line 62 is conducted in the form of parallel data in order to reduce the data transfer time because of the higher frequency of data transfer among said components.

Also a parallel-serial converting circuit 64 is provided to convert the parallel image data from the image memories 59, 60 into the serial data for the transfer to the exterior through the output port OCH1. Due to the presence of said serial-parallel converting circuit 54 and parallel-serial converting circuit 64, it is rendered possible to handle the image memory channel I as a serial input/output image memory, and to conduct the data transfer between the image memory channels in the unified serial form.

A DMA circuit 58 is provided for achieving high-speed image data transfer between said converting circuits 54, 64 and the image memories 59, 60 without relying on the memory processor CPU 55. Also an arithmetic unit 61 is provided for increasing the processing capacity of the memory processor CPU 55 in case there is required a large amount of complicated calculations for image conversion such as the image rotation.

An interface circuit 76 is provided to execute the exchange of various control signals mentioned above between the memory processor CPU 55 and the printer control system through the copy processor CPU 32 of the printer control system and the interface circuit 33.

The image memory channels II, III, composed in a same manner utilizing magnetic disks 71, 75, are provided with the input/output control switches 68, 72, synchronizing circuits 69, 73 for achieving synchronization with the image data at the input/output thereof to or from said magnetic disks and disk control circuits 70, 74 for controlling said disks. Said input/output control switches 68, 72 function to connect said disks to the channel input ports ICH2, ICH3 or to the channel output ports OCH2, OCH3 respectively at the data write-in or read-out to or from said disks. Consequently said disks are capable of directly supplying serial image data to the printer unit.

The multiplexer 53 controls the connections between the channel input ports ICH1, ICH2, ICH3 and the input ports I1, I2, I3, I4 as indicated by broken lines in FIG. 3, thus connecting each of said channel input ports selectively to either one of the input ports according the control signal $\alpha 1$. For example it forbids the connection of the channel input port ICH1 to the input ports I1 and I2 because of the difficulty in synchronization between two image data, but it allows the connection of the input port I1 to two channel input ports ICH1 and ICH2 for simultaneous storage of the input data into the semiconductor memory and the disk memory III.

Also the multiplexer 65 controls the connection between the channel output ports OCH1, OCH2, COH3 and the output ports O1, O2, O3 as indicated by broken lines in FIG. 3 according to the control signal $\alpha 2$, thus selectively connecting said output ports to said channel output ports. In a similar manner as the multiplexer 53, the multiplexer 65 for example allows simultaneous connection of the channel output port OCH1 to the output ports O1 and O2 but forbids simultaneous connection of the channel output ports OCH1 and OCH2 to the output port O1. The connection control of the multiplexers 53, 65 is achieved by the memory processor CPU 55 according to the control data to be explained in the following, wherein the allowed or prohibited simultaneous connections are automatically identified.

The control signal input/output ports CI1, CI2, CI3, CO1 and CO2 are so structured as to be respectively connected to 8-bit signal lines which are designed as follows:

(1) Control signal lines 0-2 identify the species of the connected input/output units as shown in Tab. 1, and the information is transferred between each unit shown in Tab. 1 and the memory processor CPU 55.

TABLE 1

| Signal lines | | | Unit connected | |
|---|---|---|---|---|
| 2 | 1 | 0 | | |
| 0 | 0 | 0 | Original scanner | |
| 0 | 0 | 1 | Computer | General-purpose computer |
| 0 | 1 | 0 | Word processor | |
| 0 | 1 | 1 | Communication unit | |
| 1 | 0 | 0 | Not used | |
| 1 | 0 | 1 | Not used | |
| 1 | 1 | 0 | Not used | |
| 1 | 1 | 1 | Not connected | |

(2) Control signal line 3 indicates the image data flow between each unit used and the image memory channel, and the information is transferred between each unit and the image processor CPU 55:

(2-a) A signal level "1" on said line 3 indicates the image date transfer from each unit to the image memory channel:

(2-b) A signal level "0" on said line 3 indicates the image data transfer from the image memory channel to each unit.

(3) Control signal line 4 identifies if each unit is enabled:

(3-a) A signal level "1" on said line 4 indicates that the unit is enabled:

(3-b) A signal level "0" on said line 4 indicates that the unit is disabled.

(4) Control signal line 5 allows the memory processor CPU 55 to confirm if each unit is in operation:

(4-a) A signal level "1" on said line 5 indicates that the unit is in operation:

(4-b) A signal level "0" on said line 5 indicates that the unit is not in operation.

(5) Control signal line 6 is utilized for requesting the start of operation from each unit to the memory processor CPU 55:

(5-a) A signal level "1" indicates a request:

(5-b) A signal level "0" indicates the absence of request.

(6) Control signal line 7 is utilized for transmitting the response from the memory processor CPU 55 to the request by said control signal line 6:

(6-a) A signal level "1" on said line 7 indicates that the start of operation is permitted:

(6-b) A signal level "0" on said line 7 indicates that the start of operation is prohibited.

As explained in the foregoing, the memory processor CPU 55 knows which units are connected to the input ports CI1, CI2, CI3 and output ports O1, O2, O3 and performs control over said units by means of the above-mentioned control signal lines. These control data are stored in the random access memory 57 and identified by the memory processor CPU 55 at the selection or switching or channels for achieving various controls.

Now, in the following Tabs. 2 and 3 shown are the examples of status display by the cathode ray tube display unit 4 in the system shown in FIG. 1, wherein said display is obtained from the control data stored in the random access memory 57 and transmitted to the cathode ray tube 211 of said unit 4 through the interface circuits 76, 33, 35 and 200 as explained in the foregoing.

TABLE 2

Example of I/O port display for image memory controller

| Input port | Unit used | Status | Output port | Unit used | Status |
|---|---|---|---|---|---|
| I1 | Original scanner | In use | O1 | Printer | In use |
| I2 | Communication unit | Stand-by | O2 | Communication unit | Stand-by |
| I3 | Word processor | In use | O3 | Internal connection (I4) | — |
| I4 | Internal connection (O3) | — | | | |

TABLE 3

Image memory map for image memory controller

| Memory No. | Content | Unit used | I/O |
|---|---|---|---|
| 1 | RAM 1 | Printer | Output |
| 2 | RAM 2 | Not used | — |
| 3 | DISK 1 | Original scanner | Input |
| 4 | DISK 2 | Word processor | Input |

The above-shown displays can be obtained by the instruction through the keyboard 206 to show the connection and status of the image memory controller, various units and sorter, thus contributing to the improvement of the work efficiency.

In the foregoing embodiment a cathode ray tube is employed for the display, but it is naturally possible also to employ a character recording device such as an ordinary printer for displaying various information when required.

In the following the details of the control by the memory processor CPU 55 will be further explained by the flow charts shown in FIGS. 4 and 5, which correspond to the programs stored in the read-only memory 52 and to be executed by said CPU 55. In the copying apparatus 1, in response to the request for the image data entry from the original scanner 3, general-purpose computer 5 or communication unit 6, the memory processor 10 performs the copying operation or the data transmission.

Figure 4:
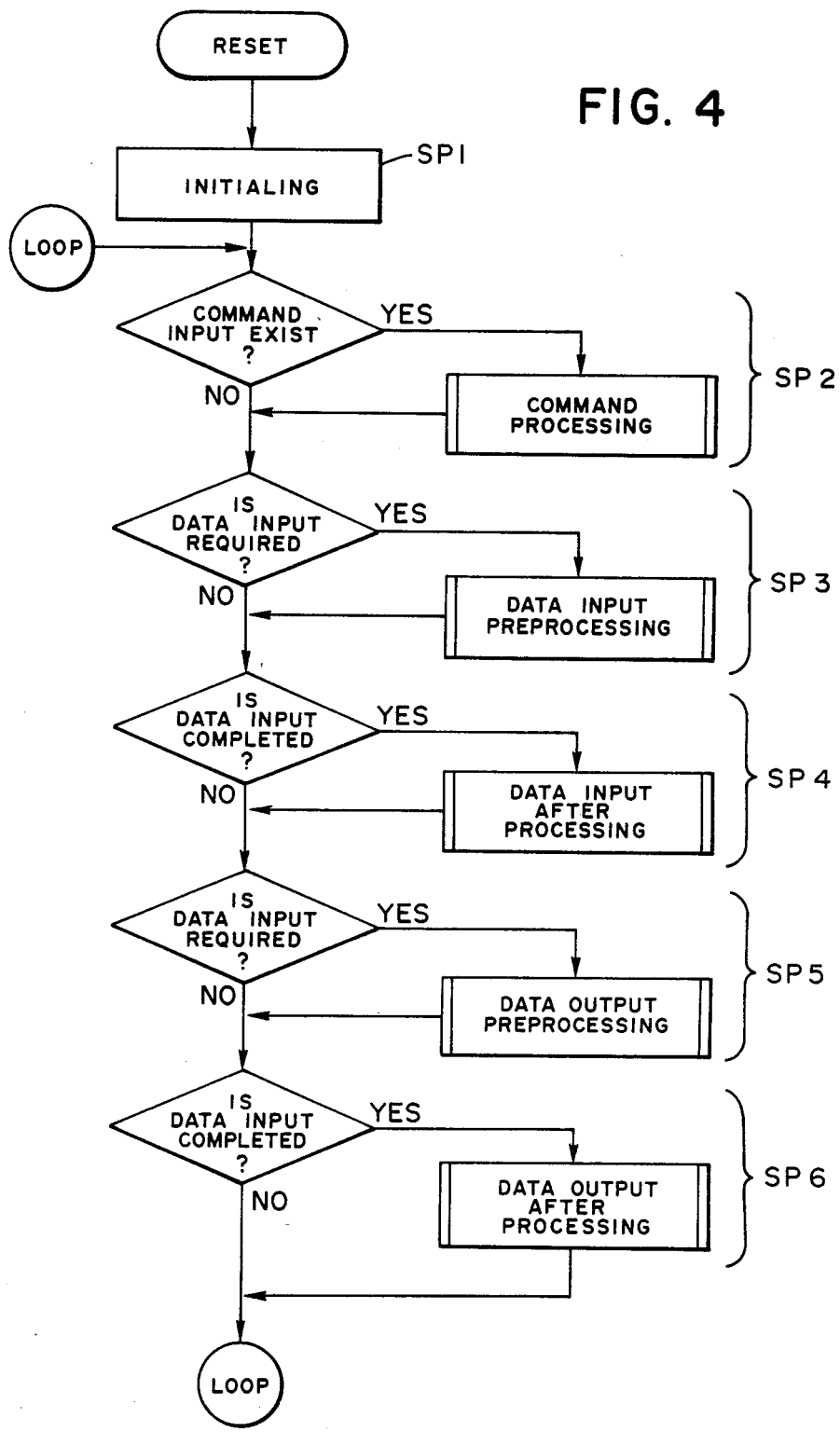

FIG. 4 is a flow chart showing the outline of the program, in which the CPU 55, after being reset upon turning on of the power supply, resets and initializes the RAM 57 and the peripheral control circuit 63 in the step SP1, whereby the multiplexers 53, 65 are disconnected, and the signals from the control lines CI1, CI2, CI3, CO1 and CO2 are read to store the species and status of the connected units in the RAM 57.

Step SP2 identifies the presence of a command from the CPU 32 to the CPU 55 requesting the information transfer concerning the connected units or the image data transfer concerning the image editing, and, if such command is present, executes the operation in response to said command in the manner as will be explained later.

Step SP3 identifies the presence of a request from the units connected to the ports CI1, CI2, CI3 to the CPU 55 for data entry, and, if such request for data entry is present, executes the corresponding operation in the manner as will be explained later.

Step SP4 identifies if the image data transfer of the input devices in the step SP4 is completed, and, upon completion thereof, executes an operation to be explained later.

Step SP5 identifies the presence of a request for image data output from the keys 24 or RAM 57 to the ports O1, O2, further identifies in the presence of such request if the printout or transmission is possible, and, if possible enables the function of the output unit through the port O1 or O2.

Step SP6 identifies if the image data transfer through the port O1 or O2 in the step SP5 is completed, and terminates the copying operation upon completion of said data transfer to await the next request.

The above-mentioned flow in FIG. 4 will be explained in further detail in the following by FIGS. 5-1 to 5-4.

Figures 1, 5:
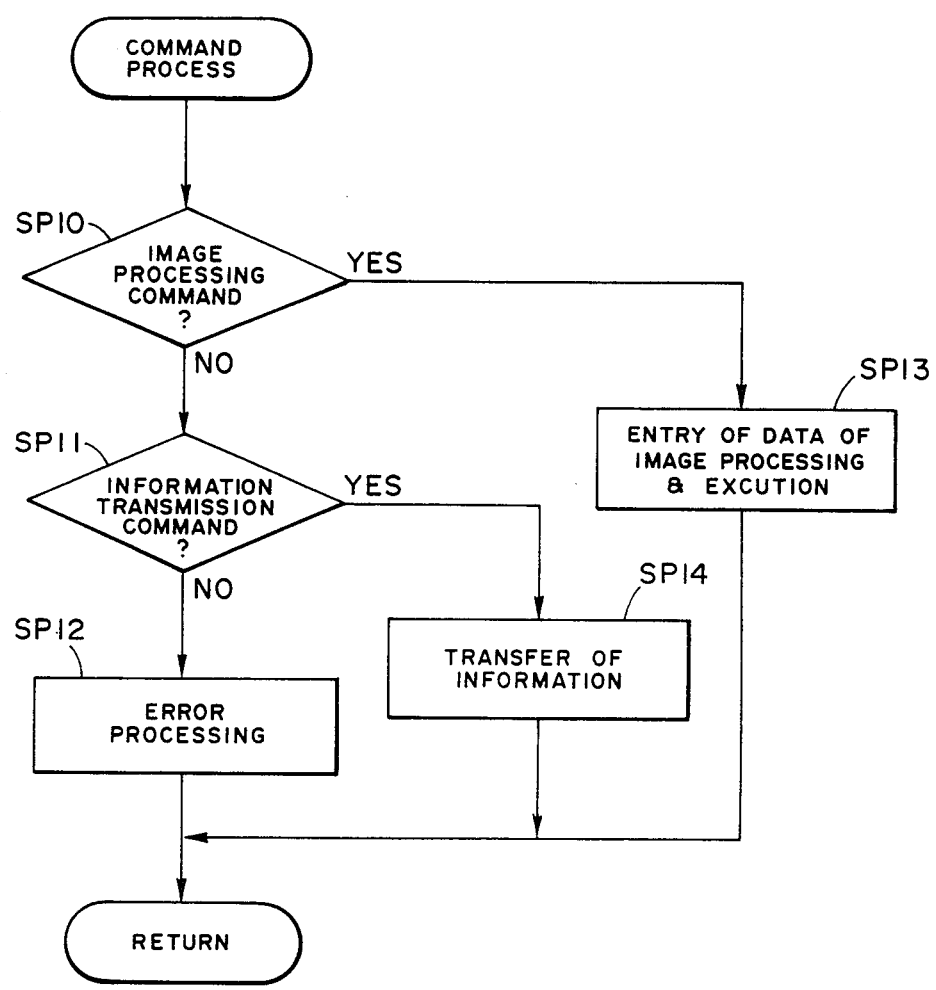
Figures 2, 5:
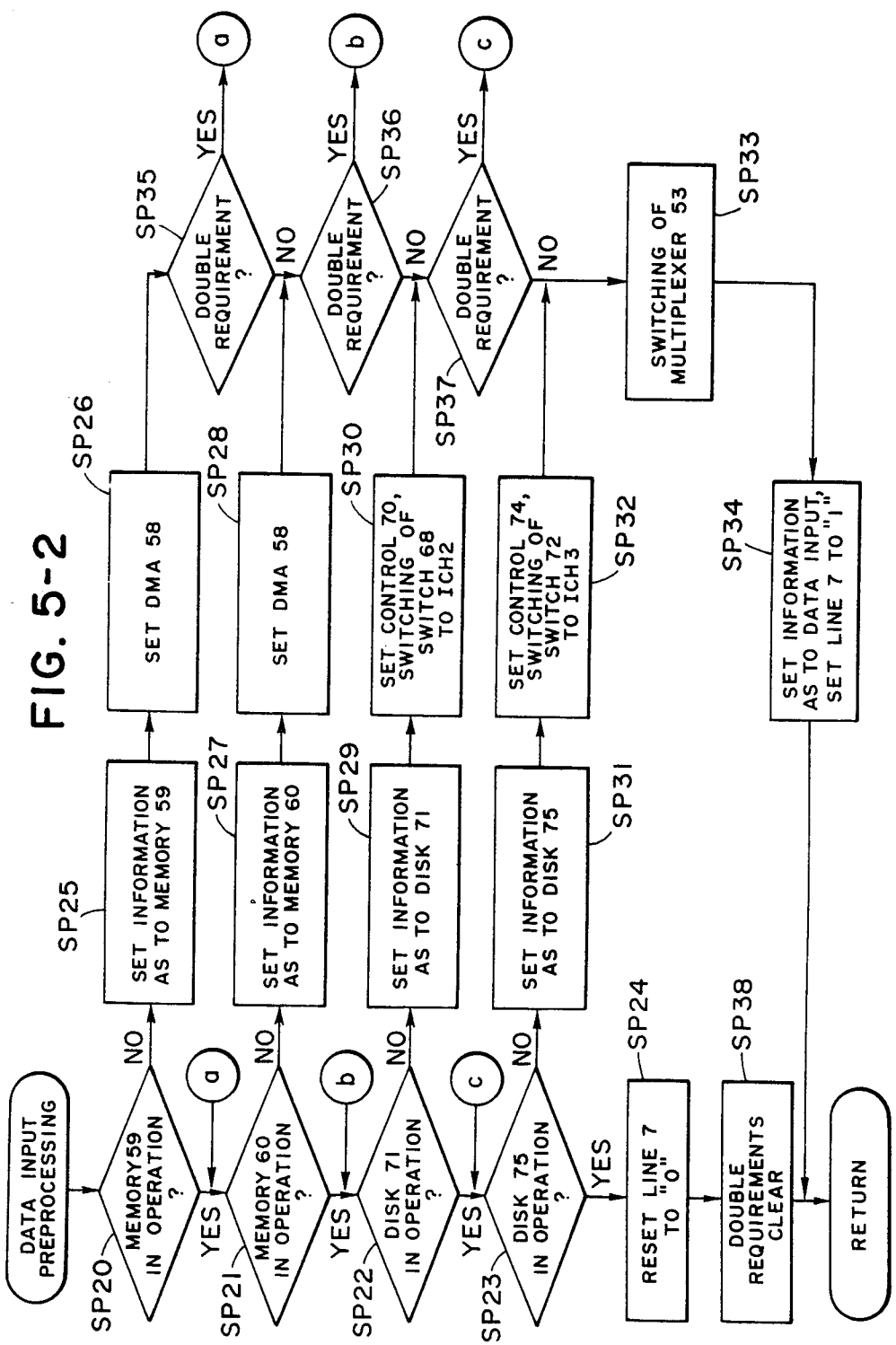
Figures 3, 5:
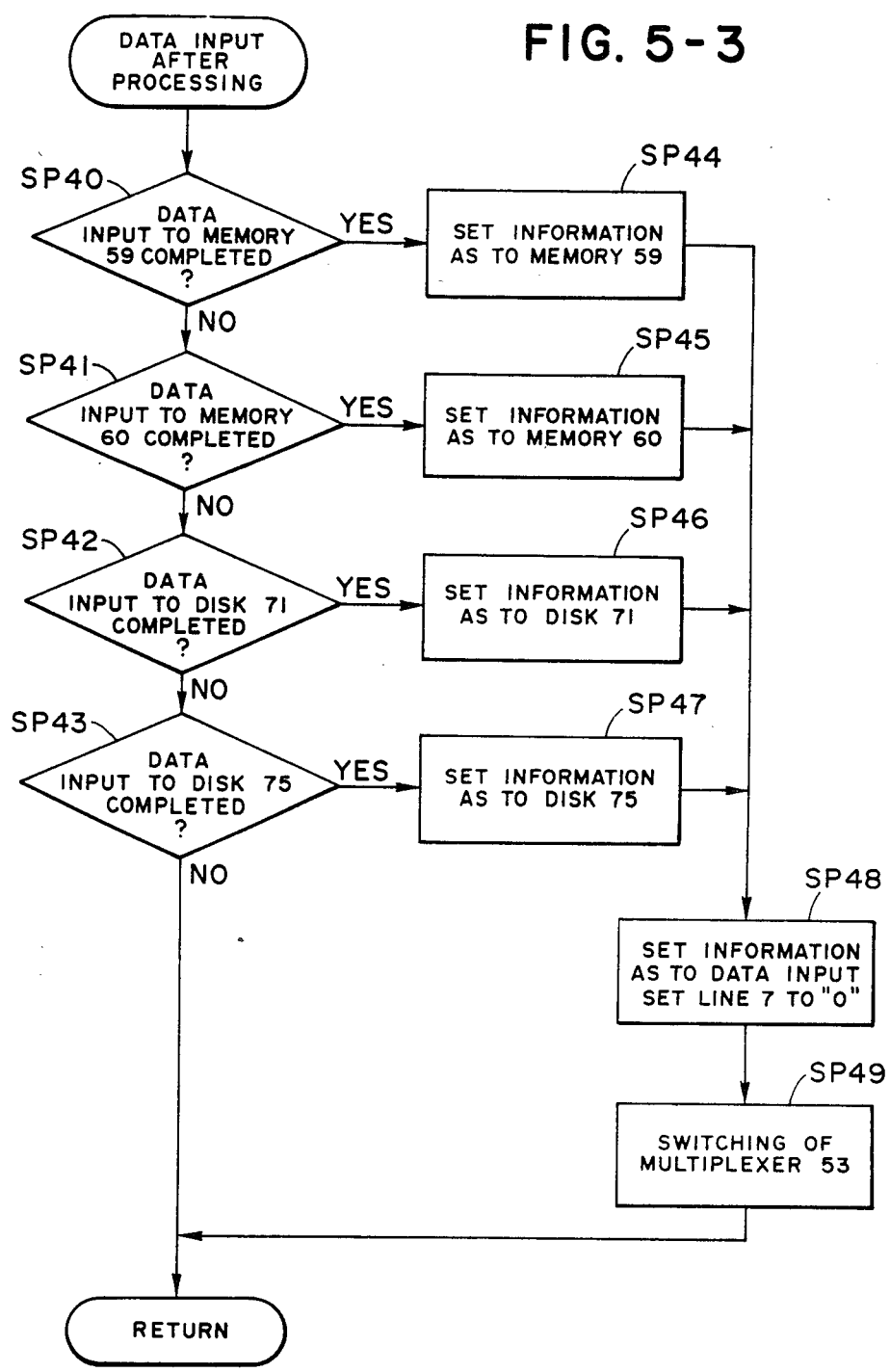
Figures 4, 5:
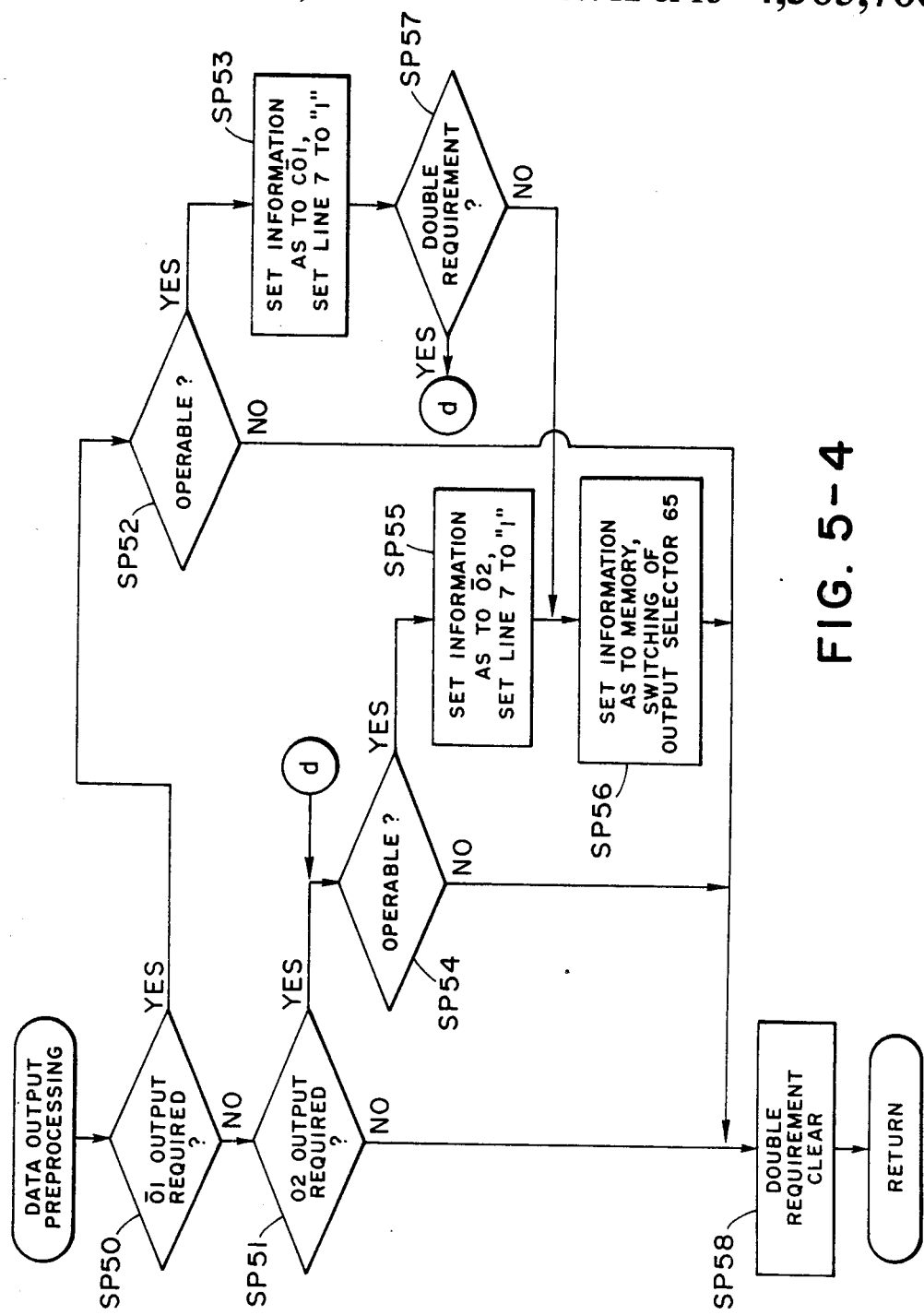
Figure 5:
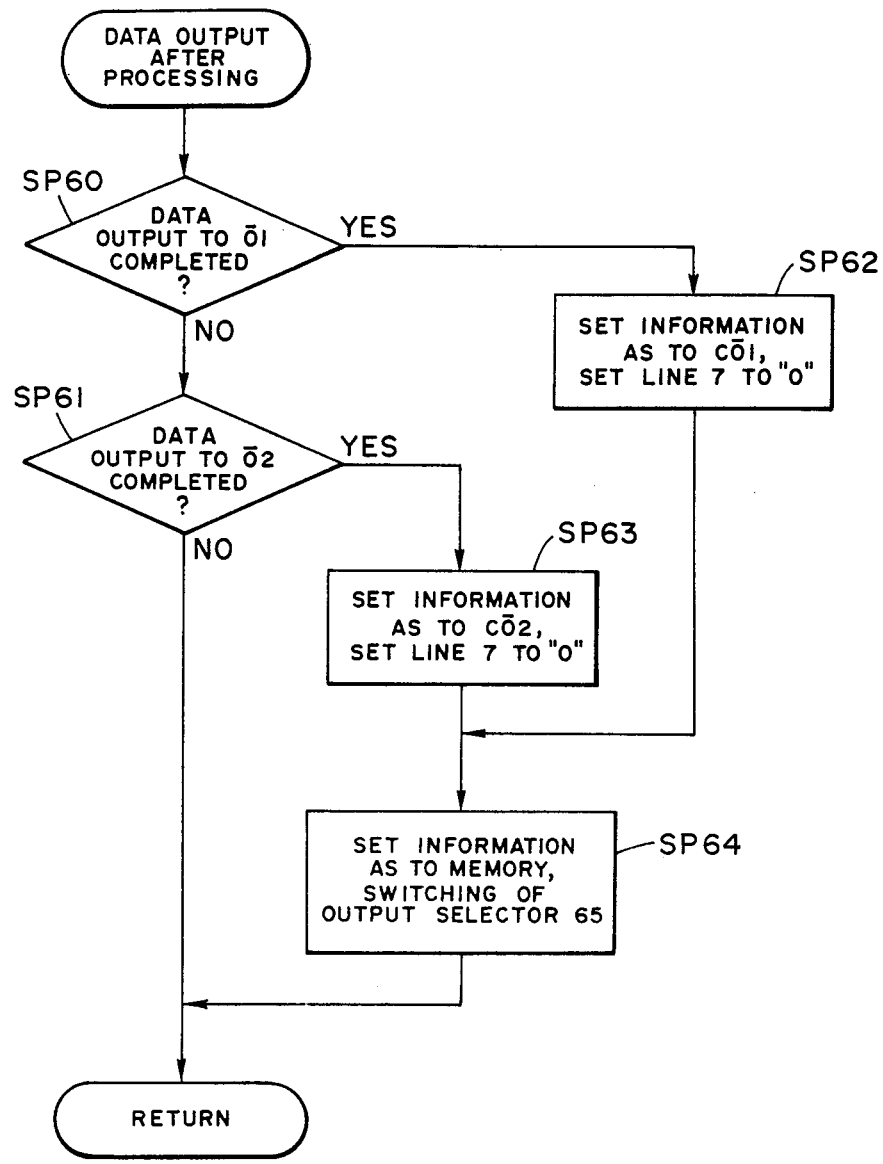

FIG. 5-1 shows a flow chart for the command process to be executed in response to a command entry for example from the operation keys 24.

Steps SP10 and SP11 identify the content of commands transferred through the interface circuit 76 of the copy processor CPU 32, and, in case of an incorrect command, the program proceeds to the step SP12 for executing an error process such as displaying an error message.

Step SP 13 executes, in response to an image conversion command, such processes as displacement, rotation, overlapping or erasing of the images already stored in the memories I, II and III by means of the high-speed arithmetic unit 61.

The above-mentioned image conversions will not be explained in detail as they are already known in the prior art. The RAM 57 memories that said image conversion process is in progress and displays this fact on the display panel 26 or on the cathode ray tube 211 when necessary.

Step SP14 is executed in response to an information transfer command, to transfer the information on connection and status of the units connected to the input-/output ports I1, I2, I3, O1, O2, image memories 59, 60 and magnetic disks 71, 75 stored in the RAM 57 to the copy processor CPU 32, which further transfers said information to the cathode ray tube display unit for display on the cathode ray tube 211, or to the display panel 26 for display thereon, in a form as shown in the foregoing Tabs. 2 and 3. It is to be noted that the displayed information is always stored in the RAM 57 and can therefore be retrieved whenever required FIG. 5-2 shows a flow chart for the pre-processing of image data entry, which is executed in response to the signal level "1" of the control signal line 6 for CI1, CI2 and CI3.

Steps SP20 to SP23 successively allot unused ones of the image memories 59, 60 and magnetic disks 71, 75 to CI1, CI2 and CI3. If all the memories are occupied, the program proceeds to the step SP24 to shift the control signal line to the level "0" indicating that the request from CI1, CI2 or CI3 is not permitted.

In case the image memory 59 is unoccupied, the program proceeds to the step SP25 to set the information on said memory 59 such as the connection status thereof, input device to be used etc. in the RAM 57, thus preparing for the command for information transfer from the CPU 32. In the next step SP26 the DMA is set to prepare for the DMA transfer of the image data.

In case the image memory 60 is unoccupied, steps SP27 and SP28 are executed in a similar manner.

In case the magnetic disk 71 is unoccupied, the program proceeds to the step SP29 to set the information on the disk 71 in the RAM 57. In the next step SP30 the disk control circuit 70 is set and the control switch 68 is changed over to the ICH2 to prepare for the image data entry.

In case the magnetic disk 72 is unoccupied, steps SP31 and SP32 are executed in a similar manner.

Step SP33 controls the input multiplexer 53 to connect the available memory to the data input device issuing the request.

Step SP34 sets the information on said input device in the RAM 57 to renew the data for status display, and shift the control signal line 7 to the level "1" to initiate the image data entry into the image memory controller 10.

The memories have the order of priority as shown in FIG. 5-2 since the occupancy of said memories are checked in this order.

In the embodiment shown in FIG. 1, the request for entry to CI1 is generated in response to an instruction for original scanning, and the original scanning is not conducted in case the entry is not permitted. The request for entry to CI2 is generated in response to the request for transmission of the signal 412, and the transmission is not conducted in case the entry is not permitted. Also the request for entry to CI3 is generated upon completion of the sentence preparation by the keyboard 206 or by the actuation of a demand key, and the image data are maintained in a memory 304 or 306 in case the entry is not permitted. Now in case all the memories are unoccupied and all the ports CI1, CI2 and CI3 issue the requests by the control signal line 6, the corresponding image data are respectively stored in the memories 59, 60 and 71 since the CPU 55 identifies the requests in the order of CI1 to CI3.

Also in case a double storage is requested automatically or by a key, unoccupied plural memories are prepared and the multiplexer 53 is switched accordingly as shown in the steps SP35 to SP37.

FIG. 5-3 shows a flow chart for post-processing after data entry to be executed after the completion of data entry. Steps SP40 to SP43 identify if the image data entry to either of the image memories 59, 60 and magnetic disks 71, 75 is completed, and, in case said data entry is completed, the program proceeds to the corresponding step SP44-SP47. The step SP44 sets the information on the image memory 59 into the RAM 57 in the same manner as the step SP25 shown in FIG. 5-2. The steps SP45-SP47 perform similar functions.

Step SP48 changes the information in the RAM 57 concerning the input device from which the image data entry is completed, and shifts the corresponding control signal line 7 to the level "0" to forbid the data entry operation. Step SP49 controls the multiplexer 53 to disconnect the input device from the memory.

FIG. 5-4 shows a flow chart for pre-processing for data output which is executed in case of the image data output to the ports O1, O2.

Steps SP50 and SP51 identify the address O1 or O2 of the image data output, according to the data output address stored in the RAM 57 at the data storage, or by a key instruction. In case of an output request to O1, step SP52 identifies if the output operation is possible according to the state of the control signal line 4 for CO1, and confirms the availability of O1 according to the state of the control signal line 5, and the step SP53 is executed when the output to the port O1 is possible (control signal line 4="1" and control signal line 5="0"). The step SP53 sets the information on the port O1 in the RAM 57, and shifts the control signal line 7 for the port O1 to the level "1" to start the function of the data output device, which is the laser beam printer in the present embodiment. Step SP56 sets the information on the connected memory in the RAM 57, and controls an output selector 65 for connection with said memory.

In case of an output request to the port O2, the program proceeds to the step SP54, and, in case the output to O2 is possible, there are similarly executed the steps SP55 and SP56.

The step SP56 simultaneously sets the DMA 58, disk control circuit 70 or 74 and control switch 68 or 72 according to the connected memory.

In the above-mentioned procedure a priority is given to the output port O1. In case of a request for double output, step SP57 identifies such request and performs the control on the selector.

FIG. 5-5 shows a flow chart for the post-processing for data output, which is executed upon completion of the image data output from the memory to the port O1 or O2.

Steps SP60 and SP61 identify if the image data output is completed according to the state of the control signal line 5 of CO1 and CO2, and, if said output is completed, the program proceeds to the steps SP62 and SP63, which set the information on O1 and O2 in the RAM 57 and shifts the control signal line 7 for CO1 and CO2 to the level "0" thereby forbidding the function. Step SP64 sets the information on the connected memory in the RAM 57 and changes over the output selector 64.

According to the programs explained in the foregoing, the CPU 55 is capable of automatically storing the entered image data in the memories and of effectively utilizing the image output devices.

In the foregoing embodiment the ports I4 and O3 provided in the multiplexers 53, 65 are mutually connected for the image data transfer between memories, for example from a magnetic disk to the image memory 59. Also in the foregoing embodiment the memories are provided between the multiplexers 53 and 65, but there may also be provided a direct channel between said multiplexers for direct image data transfer from an input port to an output port. Such channel is effective for high-speed transfer since the time required for write-in and read-out to and from the memory can be saved.

In the following given is a brief explanation on the hardware adapted for executing the above-explained programs.

The CPU 55 can be composed for example of a 16-bit general-purpose CPU "8086" supplied by Intel Corp. which has an address space as large as 1M bytes, and is popularly known in combination with the multi-bus line of the Intel standard. Also it has many peripheral elements such as "8087" usable for the high-speed arithmetic unit 61 and "8089" usable for the DMA 58, which can be utilized in combination with the multi-bus line.

The memories 59, 60 have a storage capacity exceeding the addressing ability of 1M bytes of "8086". These memories can therefore be suitably divided and utilized with memory bank switching. Also dynamic random access memory elements can be utilized for storing the data of one page of document.

What I claim is:

1. An image forming apparatus comprising:
   plural input means for generating plural input image data signals, comprising means for generating original image data signals by scanning an original;
   plural memories;
   plural output means comprising means for reproducing the image of said original on a copying material; and
   process means for storing the image data from one or more of said purality of said input means in either one of said plurality of said memories and for releasing the image data from one or more of said plurality of said memories to one or more of said plurality of said output means, said process means being operable, even upon occupation of one of said memories, to store the image data from one of said input means in another one of said memories.

2. An image processing system, comprising:
   plural input means for generating image data signals;
   plural memory means; and
   process means for storing the image data from said plural input means in said plural memory means in parallel or in a predetermined order of priority, wherein one of said memory means is selectably made to correspond to one of said input means.

3. An image processing system, comprising:
   plural input means for inputting data, including means for inputting image data;
   plural memories; and
   process means for storing the image data from one or more of said plurality of said input means in one or more of said plurality of said memories, said process means being operable, even upon occupation of one of said memories, to store the image data in another one of said memories, wherein said another memory is selectably made to correspond to one of said input means.

4. An image processing system, comprising:
   input means for inputting image data;
   plural memories;
   plural output means for outputting data, including means for providing image data; and
   process means for storing the image data from said input means in one or more of said plurality of said memories, said process means being operable, even upon occupation of one of said memories, to store the image data in another one of said memories, wherein each of said memories operably corresponds to each of said output means.

5. An image processing system, input means for inputting image data;
   plural memories;
   output means for printing or transmitting image data; and
   process means for storing the image data from said input means in one of said memories and for providing the image data from another one of said memories to said output means, said process means being operable to select an empty memory from said memories and store the image data in the selected memory.

6. An image processing system, comprising:
   input means for inputting data;
   plural memories;
   output means for printing or transmitting image data;
   process means for storing the data from said input means in one of said memories and for releasing the data from another one of said memories to said output means, wherein said process means is operable to transmit the data stored in one of said memories to another one of said memories.

7. An image processing system, comprising:
   means for reading an original image;
   means for receiving transmitted data;
   plural memories;
   means for printing an image on a recording medium; and
   processing means for storing the image data from said reading means in one of said memories and for storing the data from said receiving means in another one of said memories, each of the data stored in said plural memories being applicable to drive said printing means in common use.

8. An image processing system, comprising:
   means for generating character data in accordance with key operation;
   means for receiving transmitted data;
   plural memories;
   means for printing an image on a recording medium; and
   process means for storing the data from said receiving means in one of said memories and the data from said generating means in another one of said memories, each of the data stored in said plural means being applicable to drive said printing means in common use.

9. An image processing system, comprising:
   input means for inputting image data;
   plural memories;
   plural output means for outputting data, including means for releasing image data; and
   process means for storing the image data from said input means in one of said memories and for releasing the image data to one of said output means, said process means being operable to inhibit data release from said plural memories to one of said ouput means and to allow data release from one of said memories to said plural output means.

10. An image processing system, comprising:
    plural input means for inputting data;
    plural memories; and
    process means for storing data from one or more of said plurality of said input means in one or more of said plurality of said memories, said process means being operable to inhibit storage of the data from said plural input means in one of said memories and to allow storage of the data from one of said input means in said plural memories.

* * * * *

UNITED STATES PATENT AND TRADEMARK OFFICE
CERTIFICATE OF CORRECTION

PATENT NO. : 4,563,706

DATED : January 7, 1986

INVENTOR(S) : NAO NAGASHIMA

Figure 3B:
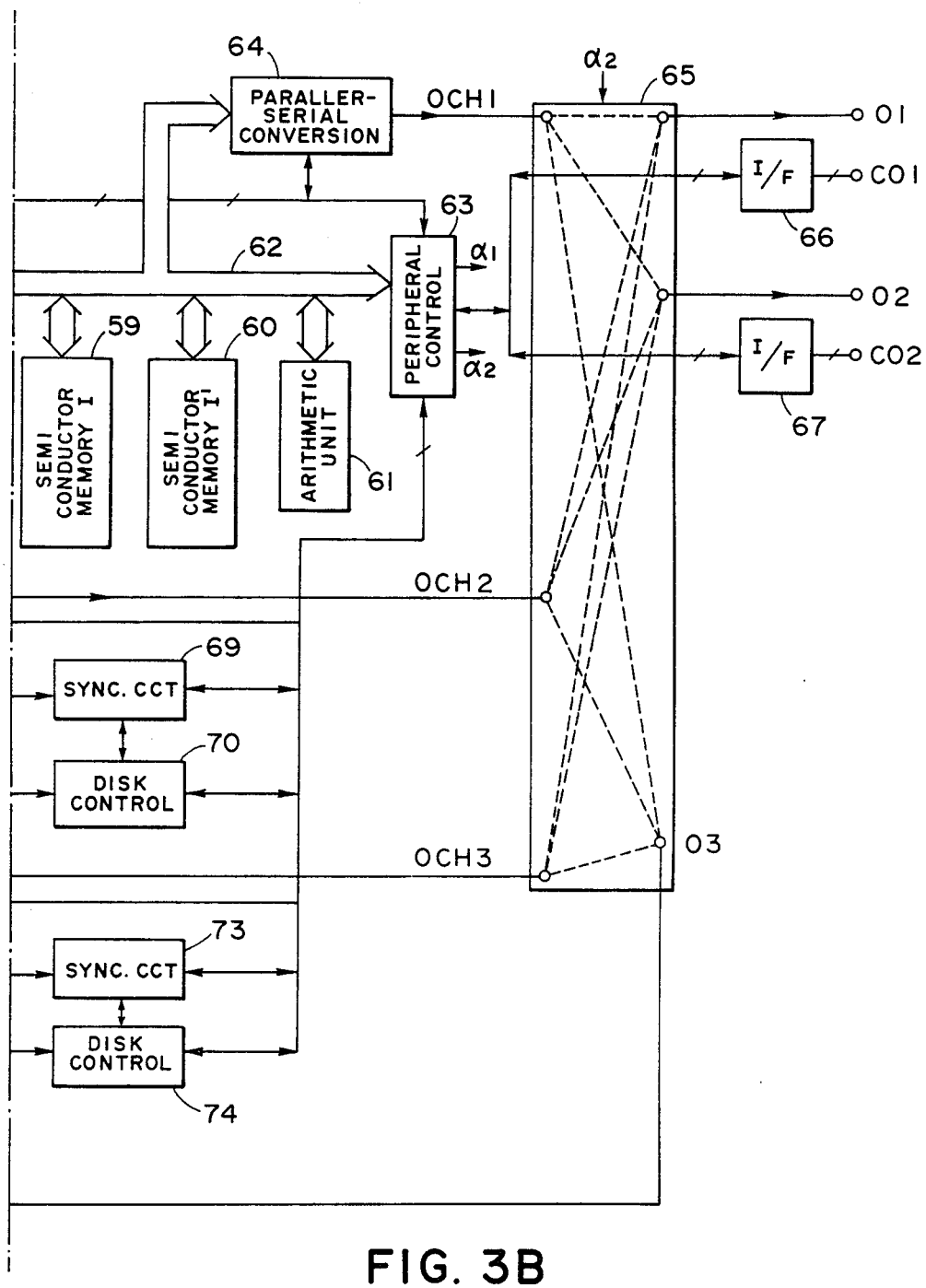

It is certified that error appears in the above-identified patent and that said Letters Patent is hereby corrected as shown below:

FIG. 3B
    Sheet 7 of 13, "PARALLER-SERIAL" should read --PARALLEL-SERIAL--.

COLUMN 1

Line 51, after "with" insert --the--.

COLUMN 2

Line 40, delete "in these combination".
    Line 46, delete "in these combination is".

CLAIM 5

Line 1, after "system," insert --comprising:--.

UNITED STATES PATENT AND TRADEMARK OFFICE
CERTIFICATE OF CORRECTION

PATENT NO. : 4,563,706

DATED : January 7, 1986

INVENTOR(S) : NAO NAGASHIMA

It is certified that error appears in the above-identified patent and that said Letters Patent is hereby corrected as shown below:

Claim 9

Line 10, "ouput" should read --output--.

Signed and Sealed this

Twenty-third Day of September 1986

[SEAL]

Attest:

DONALD J. QUIGG

Attesting Officer

Commissioner of Patents and Trademarks